United States Patent
Rao et al.

(10) Patent No.: US 11,422,571 B2
(45) Date of Patent: Aug. 23, 2022

(54) RANGE-BASED VEHICLE PLATOON ORDERING

(71) Applicant: Ford Global Technologies, LLC, Dearborn, MI (US)

(72) Inventors: Jayanthi Rao, Dearborn, MI (US); Cynthia Neubecker, Dearborn, MI (US); Pramita Mitra, Dearborn, MI (US); Perry MacNeille, Dearborn, MI (US); Brad Ignaczak, Dearborn, MI (US); Somak Datta Gupta, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 16/770,749

(22) PCT Filed: Dec. 13, 2017

(86) PCT No.: PCT/US2017/066130
§ 371 (c)(1),
(2) Date: Jun. 8, 2020

(87) PCT Pub. No.: WO2019/117894
PCT Pub. Date: Jun. 20, 2019

(65) Prior Publication Data
US 2021/0173411 A1    Jun. 10, 2021

(51) Int. Cl.
*G05D 1/02* (2020.01)
*B60L 58/13* (2019.01)

(52) U.S. Cl.
CPC ........... *G05D 1/0295* (2013.01); *B60L 58/13* (2019.02); *G05D 1/0293* (2013.01); *B60L 2260/52* (2013.01); *B60L 2260/54* (2013.01)

(58) Field of Classification Search
CPC .... G05D 1/0295; G05D 1/0293; B60L 58/13; B60L 2260/52; B60L 2260/54; Y02T 10/70; G08G 1/22
See application file for complete search history.

(56) References Cited

U.S. PATENT DOCUMENTS 11,144,068 B2 * 10/2021 Kim ...................... G05D 1/0295
2010/0256836 A1 * 10/2010 Mudalige ............... G08G 1/164
701/2

(Continued)

OTHER PUBLICATIONS

Schellenberg, S. et al., "How Electric Vehicles Can Benefit from Vehicular Networking," In: 3rd GI/ITG KuVS Fachgespräch Inter-Vehicle Communication (FG-IVC 2015), published on Mar. 2015, Retrieved from Internet URL: https://www.researchgate.netpublication/309242519_How_Electric_Vehicles_Can_Benefit_from_Vehicular_Networking>, pp. 1-4.

(Continued)

*Primary Examiner* — Donald J Wallace
(74) *Attorney, Agent, or Firm* — Brandon Hicks; Eversheds Sutherland (US) LLP (57) ABSTRACT

Vehicles that are autonomous or human-operated may drive in a platoon to achieve energy savings. A leader vehicle receives information broadcasts from following vehicles that include a state of energy and one or more other values such as energy usage rates, range, destination, and aerodynamic properties. The leader vehicle may then determine an ordering of vehicles that increases the range of the platoon, e.g., reduces the number of refueling/recharging stops of the platoon. Other considerations for ordering the vehicles may include overall energy savings and a fair distribution of energy savings. A desired ordering may be achieved by transmitting swap commands to pairs of vehicles until the platoon is in the correct ordering.

16 Claims, 5 Drawing Sheets

(56) References Cited

U.S. PATENT DOCUMENTS

| | | | |
|---|---|---|---|
| 2010/0256852 A1* | 10/2010 | Mudalige | G08G 1/22 |
| | | | 701/24 |
| 2016/0026187 A1* | 1/2016 | Alam | B60W 30/16 |
| | | | 701/23 |
| 2016/0054736 A1* | 2/2016 | Kolhouse | G08G 1/20 |
| | | | 701/96 |
| 2017/0122841 A1 | 5/2017 | Dudar et al. | |
| 2017/0308097 A1 | 10/2017 | Switkes et al. | |
| 2017/0349176 A1 | 12/2017 | Alden et al. | |
| 2018/0018605 A1* | 1/2018 | Light-Holets | G06Q 10/06311 |
| 2018/0188746 A1* | 7/2018 | Lesher | G08G 1/22 |
| 2018/0348791 A1* | 12/2018 | Hendrickson | G05D 1/0293 |
| 2019/0080373 A1* | 3/2019 | Takoshima | G06Q 30/0283 |
| 2019/0286120 A1* | 9/2019 | Stenneth | G01C 21/3438 |

OTHER PUBLICATIONS

International Search Report of the International Searching Authority for PCT/US2017/066130 dated Mar. 7, 2018.

* cited by examiner

RANGE-BASED VEHICLE PLATOON ORDERING

BACKGROUND

Field of the Invention

This invention relates to coordinated driving of vehicles in a platoon.

Background of the Invention

At high speeds, significant energy savings may be obtained by a vehicle by following a preceding vehicle sufficiently closely to remain in a slip stream of the preceding vehicle. This principle is used often in automobile racing and has also been proposed as a means for achieving fuel savings while traveling on public roads (see, e.g., U.S. Pat. No. 8,352,111; DE 102015011271; US 2015/0262481; U.S. Pat. No. 9,037,389; WO 2015047175; and U.S. Pat. No. 9,494,944; Fred Browand, Mark Michaelin, Aerospace & Mechanical Engineering, USC, "Platoon Travel Saves Fuel . . . How Much?," Intellimotion, vol. 9, no. 2 (2000), all of which are incorporated herein by reference in their entirety).

The system and methods disclosed herein provide an improved approach for platooning vehicles on public roads.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
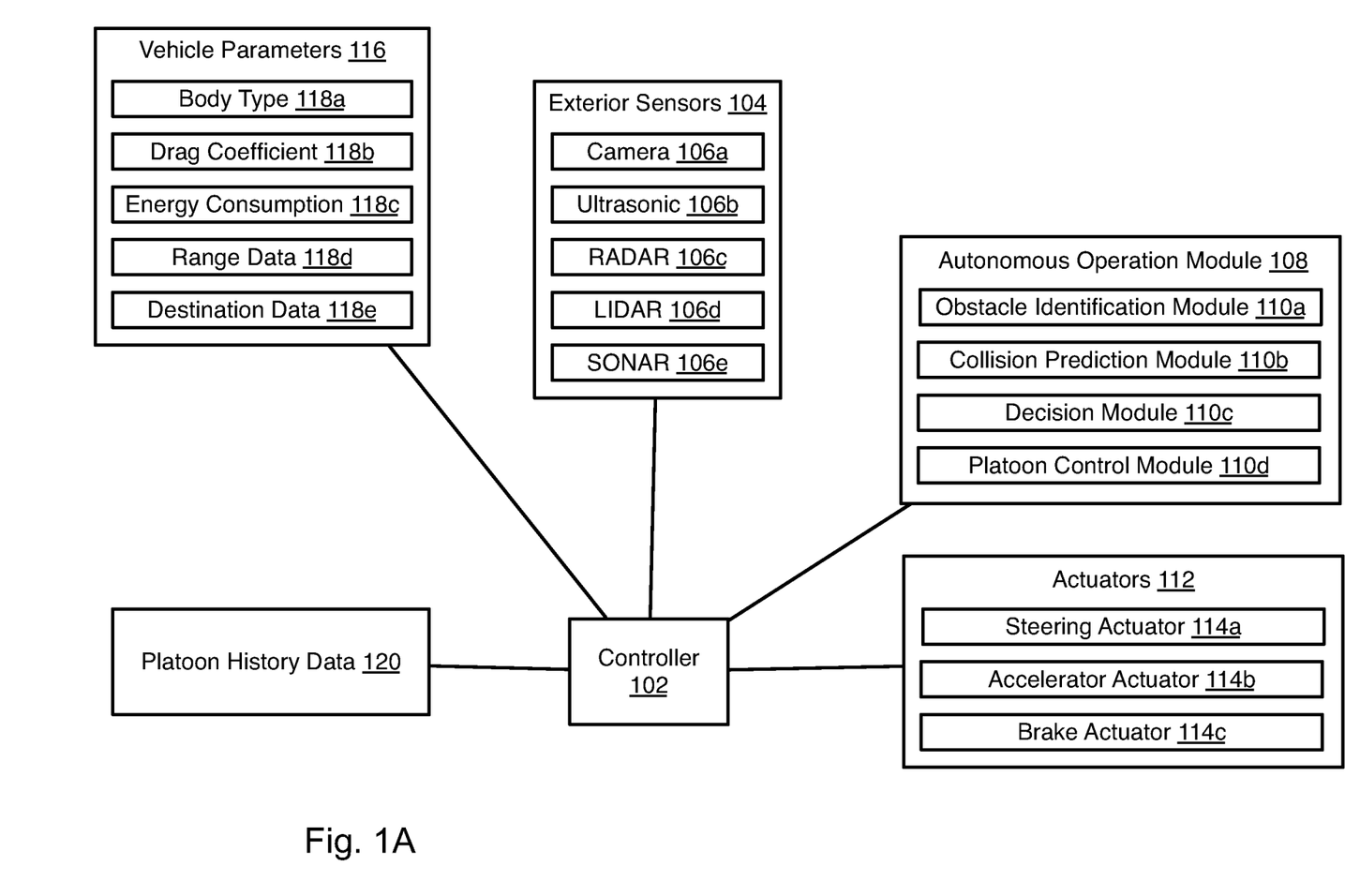
FIG. 1A is a schematic block diagram of components implementing an autonomous vehicle for platooning in accordance with an embodiment of the present invention.

Referring to FIG. 1A, a vehicle used according to the methods disclosed herein may be may be a small capacity vehicle, such as sedan or other small vehicle or a large capacity vehicle such as a truck, bus, van, large sport utility vehicle (SUV), or the like.

The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, a controller 102 of the vehicle may perform autonomous navigation and collision avoidance. The controller 102 may receive one or more outputs from one or more exterior sensors 104. For example, one or more cameras 106a may be mounted to the vehicle 100 and output image streams received to the controller 102.

The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments disclosed herein, the autonomous operation module 108 may perform autonomous navigation to a specified location, autonomous parking, and other automated driving activities known in the art.

The autonomous operation module 108 may cooperate with one or more other vehicles to drive in a platoon for purposes of extending the range of one or more vehicles in the platoon and reducing the number of stops of the platoon. To that end, the autonomous operation 108 may include a platoon control module 110d that executes the methods disclosed herein in combination with the platoon control modules 110d of a plurality of other vehicles.

The platoon control module 110d may operate with respect to one or more items of data such as vehicle parameters 116 and platoon history data 120. The vehicle parameters 116 may include a body type 118a (truck, sedan, SUV, semi-truck, etc.). The body type 118a may include dimensions of the vehicle sufficient to enable determining aerodynamic drag on the vehicle and on a following vehicle. The vehicle parameters 116 may further include a drag coefficient 118b for the vehicle.

The vehicle parameters 116 may further include energy consumption data 118c, such as an amount of fuel consumed with respect to power in the form of a function or table of fuel consumption (gallons of fuel per minute, WattHours/Joules per second, etc.) at various power output values. The vehicle parameters may further include range data 118d, such as the current amount of fuel remaining and an estimated distance remaining for the amount of fuel remaining based on the vehicle's current speed or an amount of kilowatt hours (kWH) of charge remaining in a battery and an estimated distance remaining based on the amount of kWh remaining in the battery and the vehicle's current speed. The vehicle parameters may further include destination data 118e, i.e. an intended destination of the vehicle.

The platoon history data 120 may indicate past orderings of vehicles in a platoon and a speed and time of travel of the vehicles in each past ordering. As discussed below, this may facilitate distribution of energy savings more fairly among vehicles of a platoon. The platoon history data 120 may record an amount of energy savings from driving in the platoon received by the vehicle from a time of joining a platoon to a current time.

Figure 1B:
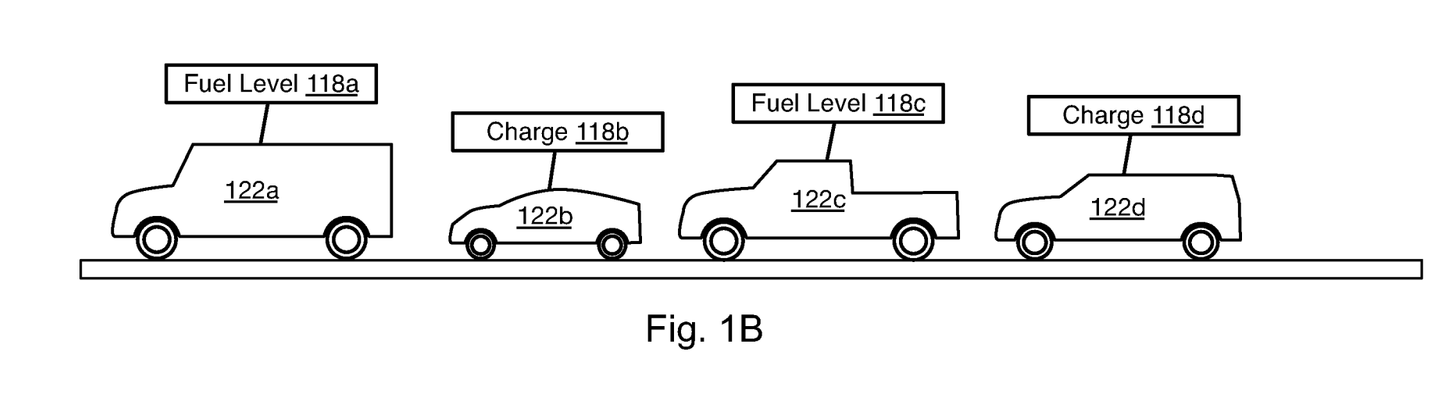
FIG. 1B is a schematic block diagram of a platoon of vehicles in accordance with an embodiment of the present invention.

Referring to FIG. 1B, in practice, vehicles 122a-122d according to FIG. 1A may travel in a platoon as illustrated. Each vehicle has a corresponding available energy 118a-118d, which is a fuel level for combustion vehicles and a state of charge for electric vehicles. A possible platoon ordering according to the methods described herein may place a smaller electric vehicle 122b behind larger combustion vehicles 122a to provide energy savings from drafting to the electric vehicle 122b that has a reduced range and a longer recharging time.

Figure 2:
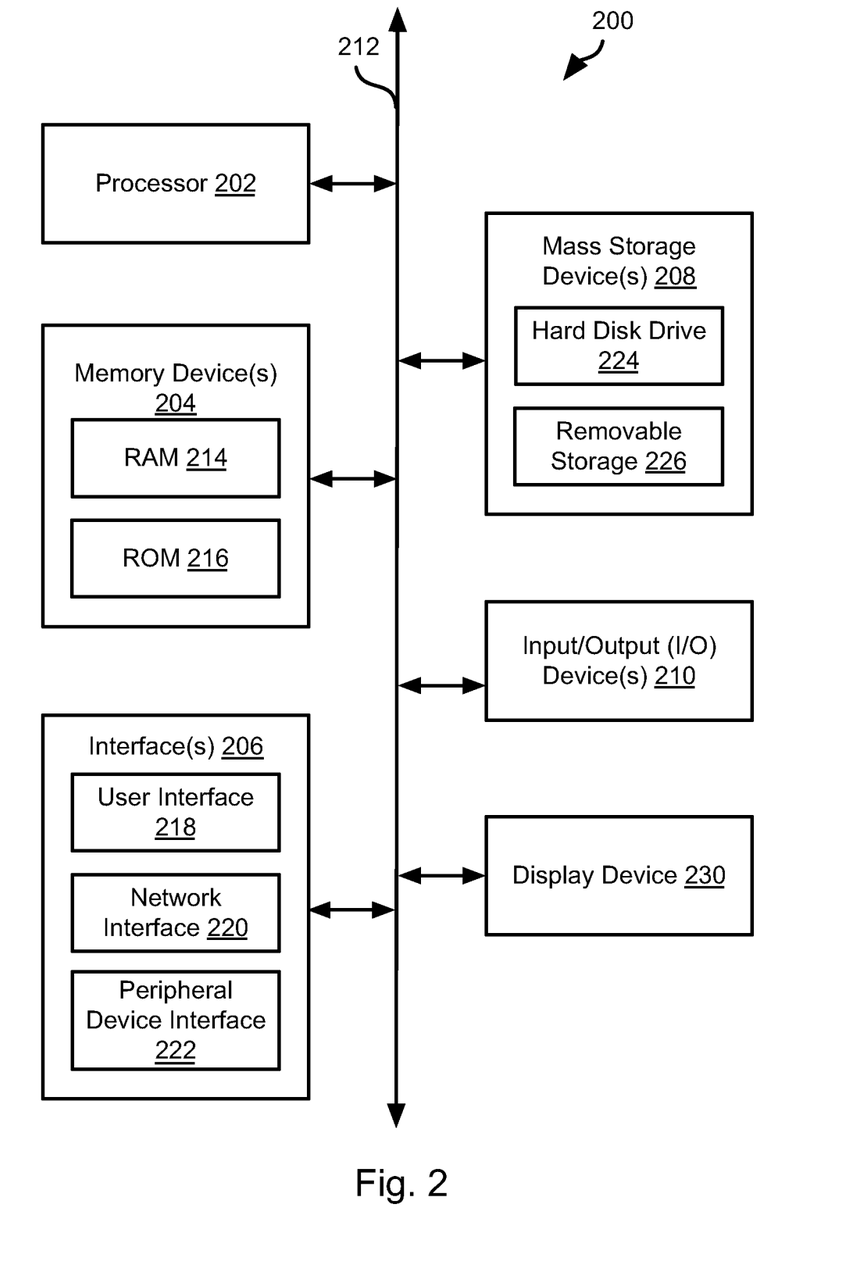
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 of a vehicle may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
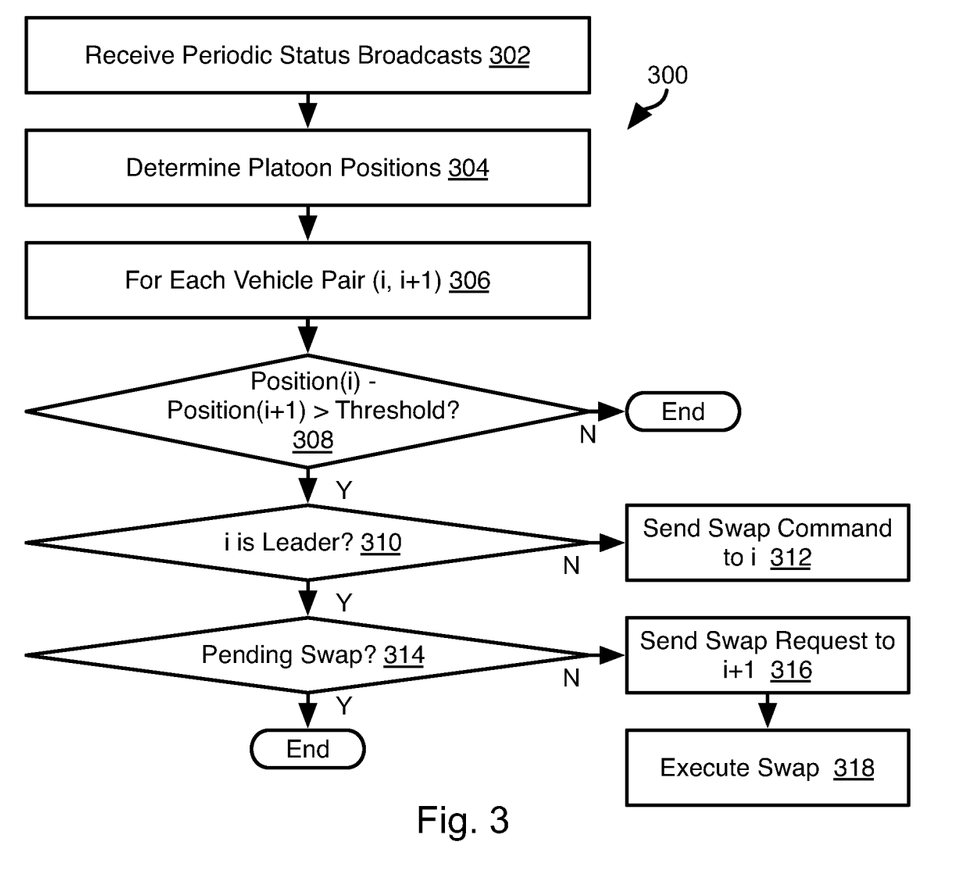
FIG. 3 is a process flow diagram of a method for operating a leader vehicle of a platoon in accordance with an embodiment of the present invention.

Referring to FIG. 3, the illustrated method 300 may be executed by the controller 102 of a vehicle in order to implement a platooning method. The illustrated method 300 may be executed by a vehicle in a platoon operating as a leader of the platoon. In some embodiments, the leader of a platoon is the first vehicle in the platoon. Accordingly, when a new ordering of the platoon is implemented and the leader changes, the new first vehicle may become the leader and implement the method 300 from that point. The platoon history data 120 may be updated by each vehicle that operates as the leader and be transferred to a new leader vehicle when the leader changes to the new leader vehicle. In some embodiments, another vehicle position may also operate as the leader of the platoon such that changing of the leader is not performed.

The method 300 may include receiving 302 periodic status broadcasts from other vehicles in the platoon. Status broadcasts may include the available energy (fuel, charge) of a vehicle. Status broadcasts may include one or more of the vehicle parameters 116 for use in determining an ordering of vehicles in the platoon. Alternatively, the parameters 116 may be transmitted initially and not thereafter transmitted. For example, the vehicle parameters 116 may be transmitted when a vehicle joins a platoon or to the new leader vehicle when the leader changes but not otherwise transmitted as part of status broadcasts. A status broadcast from a vehicle may also include a position of the vehicle in the form of a GPS (Global Positioning System) coordinate, an index (position in order), an identifier of the vehicle, an identifier (license plate or other identifier captured using a camera) of a vehicle in front and/or behind the vehicle, or other information.

The method 300 may then include determining 304 positions for vehicles in the platoon according to information contained in the status broadcasts and possibly according to the platoon history data 120.

Various decision algorithms may be used to determine 304 positions for vehicles in the platoon. For example, where increasing the range (e.g., reducing stops) is a priority, step 304 may include identifying the vehicle with the shortest range, e.g. an electric vehicle with the lowest state of charge. A platoon ordering may be selected that provides the most favorable aerodynamic conditions for that vehicle.

In general, this may include placing that vehicle behind a largest vehicle in the platoon, e.g. a truck. Step 304 may include evaluating energy savings for the shortest-ranged vehicle for a plurality of possible alternatives, e.g. all possible orderings where computational resources are available. The ordering that provides the greatest energy savings for the shortest-ranged vehicle may then be selected. Where computational resources are limited, step 304 may include first identifying which of the other vehicles in the platoon provides the best energy savings when the shortest-ranged vehicle is drafting behind it. Once this pair of vehicles is identified, the ordering of this pair along with other vehicles in the platoon may be selected to provide energy savings for the entire convoy, such as using any approach known in the art (see documents referenced in the "Background" section).

In some embodiments, if the energy savings provided to the shortest-ranged vehicle is more than is necessary than needed for the shortest-ranged vehicle to reach its destination, then among all possible orderings, then the selected ordering may be one that provides the greatest aggregate fuel savings for the platoon among those orderings that provide sufficient energy savings to the shortest-ranged vehicle to reach its destination.

In some instances, multiple vehicles will have energy levels that are limiting. Accordingly, among all possible orderings, one may be selected that provides for the fewest number of refueling stops before reaching a destination. This may be determined by modeling energy consumption of the vehicles traversing a route according to the vehicle parameters for each ordering. In particular, reduction in drag may be estimated to determine energy consumption of each vehicle and its estimated range for a given ordering.

The selected ordering then provides energy savings from drafting to those vehicles that have the shortest range at the expense of vehicles that have longer range even if the aggregate energy savings of the platoon are less than possible with a different ordering. Where multiple orderings have the same lowest number of stops, then the selected ordering from among these may provide the greatest aggregate energy savings.

Where multiple orderings have the same number of stops, then an ordering may also be selected based on considerations of fairness, i.e., such that energy savings are distributed among vehicles of the platoon. This is particularly the case where the vehicles of the platoon are not commonly owned or working for the same entity, e.g., an ad hoc platoon. An example fairness algorithm is described in "A Universal Modular Actor Formalism for Artificial Intelligence," Carl Hewitt; Peter Bishop; Richard Hewitt, International Conference on Artificial Intelligence (1973), which is hereby incorporated herein by reference.

As noted above, a platoon history 120 may be maintained. Accordingly, where an ordering is selected according to fairness, the platoon history 120 may be used. In particular, an amount of energy savings received by a vehicle may be used to determine an amount of energy savings to be received by the vehicle in an updated ordering. In particular, over time the orderings may be selected such that the amount of fuel savings received by all vehicles of the platoon approach an equal value or a value determined for each vehicle according to the fairness algorithm. In some embodiments, monetary compensation may be automatically calculated and transferred to owners of vehicles that do not benefit from platooning. For example, compensation may be made by owners of smaller vehicles to owners of larger vehicles that provide a drafting benefit but are unable to benefit from drafting behind smaller vehicles. The amount of compensation may be such that all parties still benefit from platooning, e.g. half of the cost of energy savings provided to the smaller vehicle in the illustrated example.

Once the ordering is determined 304, the remaining steps of the method 300 may be executed by the leader vehicle.

In particular, each vehicle in the current ordering of vehicles in the platoon may be designated with an index i=1 to N indicating the position in the current ordering, where N is the total number of vehicles in the platoon and i=1 is the first vehicle in the platoon, i.e. the leader vehicle, and N is the last vehicle. A value Position(i) indicates the new position of vehicle i in the new ordering determined at step 304.

The method 300 may include looping 306 through each pair of contiguous vehicles i and i+1 in the current ordering according to steps 308-318. If Position(i)-Position(i+1) is found 308 not to be greater than a threshold value, then no action is taken with respect to vehicles i and i+1. In particular, only if Position(i) is greater than Position(i+1) will any action be taken. This is the case because if Position (i) is greater than Position(i+1), then vehicle i needs to be moved to a higher index position than vehicle i+1 and therefore a swap is needed since vehicle i is currently at a lower index position than vehicle i+1. Accordingly, the threshold value may be selected to be 1.

If the condition of step 308 is met, the method 300 may include evaluating 310 whether vehicle i is currently the leader. If not, then the leader vehicle sends 312 a swap command to vehicle i, or both of vehicles i and i+1. The manner in which the swap command is processed is described below with respect to FIGS. 4 and 5.

If vehicle i is found 310 to be the leader, the method 300 may include evaluating 314 whether vehicle i currently has a pending swap. In particular, if a previous iteration of step 308-314 resulted in a vehicle i being commanded to swap and this swap is either in process or has not yet been completed. For example, each time a vehicle is commanded to swap a flag may be set by that vehicle indicating that that vehicle has a pending swap. Upon completing the swap, the vehicle then clears the flag. Accordingly, if this flag is set for vehicle i, then it may be determined to have a pending swap.

If vehicle i is found 314 to have a pending swap then no action is taken and the method 300 ends with respect to vehicles i and i+1. The method 300 may continue at step 306 with respect to the next pair of contiguous vehicles, e.g. i+1 and i+2. Note that at each iteration of step 306, the current indexes of the vehicles may be updated according to any swaps completed during a previous iteration of step 306.

If vehicle i does not currently have a pending swap, then vehicle i sends 316 a swap request to vehicle i+1 and vehicles i and i+1 execute 318 the swap by trading places, such as according to the method described below with respect to FIGS. 4 and 5.

The method 300 may be repeated periodically, such as to recalculate the ordering to promote fairness or to account for changes in energy level of vehicles of the platoon. The method 300 may also be repeated periodically until the ordering of the vehicles is according to the ordering determined at step 304. For example, where swaps are suppressed due to another pending swap, one or more other iterations of the method 300 may be required to arrive at the desired ordering.

Figure 4:
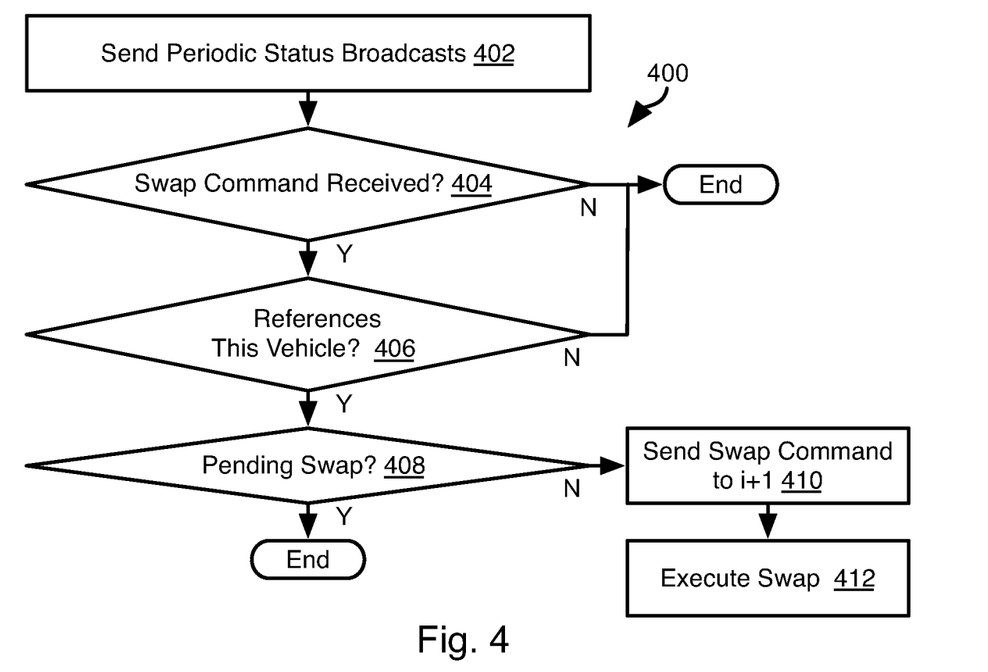
FIG. 4 is a process flow diagram of a method for processing commands from a leader vehicle of a platoon by another vehicle in accordance with embodiments of the present invention.

Referring to FIG. 4, the illustrated method 400 may be executed by a vehicle i in response to receiving a swap command, such as swap command transmitted at step 312 of the method 300. In some embodiments, the swap command is addressed to only one vehicle of the pair of vehicles that need to change places, which is reflected in the method of FIG. 4.

The method 400 may include sending 402 periodic broadcasts by the vehicle i. The content of these broadcasts may be as described above with respect to step 302 of the method 300, i.e. the available energy (fuel, charge) of the vehicle i. The broadcasts may also indicate whether the vehicle i has completed a previously commanded swap and possibly the vehicle's current position in the form of a GPS coordinate or identifiers of vehicles in front and behind the vehicle i.

If a swap command is not found 404 to have been received, then the method 400 ends. If so, then the method 400 may include evaluating 406 whether the swap command refers to the vehicle i. For example, a length of a platoon may be greater than the range of the short range communication protocol used (e.g., Dedicated Short Range Communications (DSRC) protocol). Accordingly, if the command is not found 406 to refer to the vehicle i, the vehicle i may retransmit the command to following vehicles. In other embodiments, forwarding is omitted and the command is simply ignored if not addressed to the vehicle i. Alternatively, cellular communication may be used such that forwarding is not performed.

If the command is found 406 to reference the vehicle i and the vehicle i is found 408 not to have a pending swap, then the vehicle i sends 410 a swap request to vehicle i+1 and the swap is executed 412 by the vehicles i and i+1 trading places. After executing the swap, the vehicles i and i+1 will no longer have a pending swap according to this iteration of the method 400.

Figure 5:
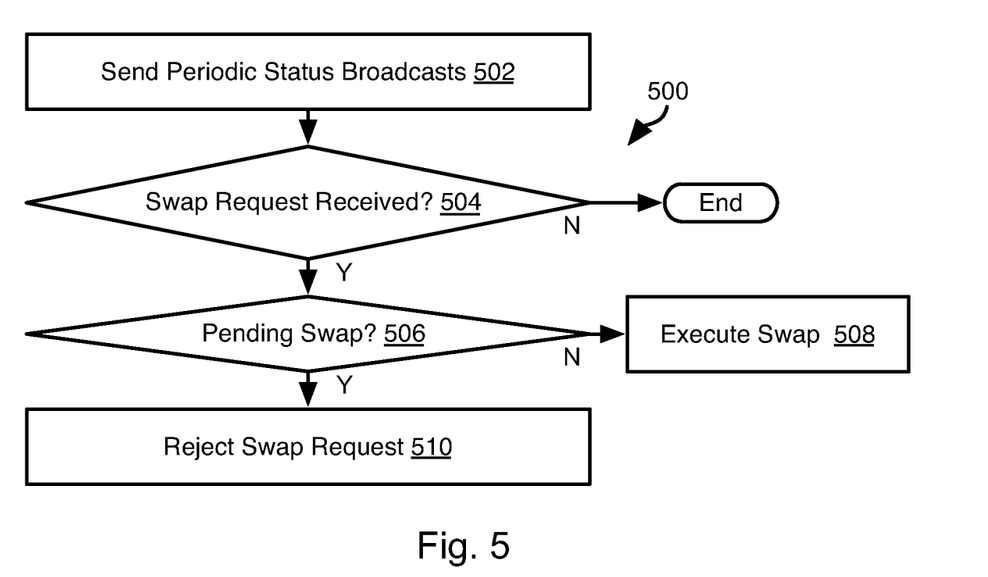
FIG. 5 is a process flow diagram of a method for processing a request to swap positions by a vehicle of a platoon in accordance with embodiments of the present invention.

FIG. 5 illustrates a method 500 that may be executed by a vehicle i+1 in response to a swap request from a vehicle i. The vehicle i+1 may transmit 502 periodic status broadcasts in the same manner as for step 402.

If a swap request is found 504 to have been received and the vehicle i+1 is found 506 to not have a pending swap, then the swap is executed 508 by the vehicle i and the vehicle i+1 trading places in the platoon. Trading places may include vehicle i+1 driving laterally out of the platoon and passing the vehicle i. The vehicle i may also slow down after vehicle i+1 pulls out of traffic to permit the vehicle i+1 to pass and then rejoin the platoon in front of vehicle i+1. Alternatively, vehicle i may pull out of the platoon and allow vehicle i+1 to move forward in the platoon followed by vehicle i rejoining the platoon behind vehicle i+1.

If the vehicle i+1 has a pending swap, then the swap request may be rejected 510. The vehicle i+1 may define a pending swap in the same manner described above with respect to the vehicle i. Rejecting 510 the swap request may include simply ignoring the swap request. Rejecting 510 may include transmitting a notification to the vehicle i indicating that the swap cannot be performed. In response, the vehicle i may wait for a delay period corresponding to the time required to execute a swap, e.g. 20 seconds, and then retransmit the swap request to vehicle i+1.

The above methods are described in the context of autonomous vehicles that will execute the swaps as instructed. In other embodiments, one or more of the vehicles of the platoon may be human operated. Accordingly, executing swaps may include transmitting a message to a driver of the vehicles that instructs the drivers to execute a swap.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a controller of a leader vehicle:
receiving remaining ranges for a plurality of other vehicles;
determining an ordering of the leader vehicle and the plurality of other vehicles effective to increase a combined range of the leader vehicle and the plurality of other vehicles traveling as a platoon, wherein increasing the combined range of the leader vehicle and the plurality of other vehicles traveling as the platoon comprises calculating an updated ordering such that a vehicle of the leader vehicle and the plurality of other vehicles that has a shortest range receives energy savings from drafting regardless of whether the leader vehicle and the plurality of other vehicles realize an overall energy savings from traveling in the platoon in the updated ordering, and wherein determining the ordering of the leader vehicle and the plurality of other vehicles comprises:
evaluating past orderings of the leader vehicle and the plurality of other vehicles over time and a speed and time of travel of each of the leader vehicle and the plurality of other vehicles during the past orderings;
determining the ordering partially based on a fairness metric of distribution of energy savings among the leader vehicle and the plurality of other vehicles over time; and
transmitting an instruction to at least a portion of the plurality of other vehicles to rearrange according to the ordering.

2. The method of claim 1, wherein the leader vehicle and the plurality of other vehicles are autonomous.

3. The method of claim 1, wherein one or more vehicles of the plurality of other vehicles are one or more electric vehicles.

4. The method of claim 3, further comprising:
periodically receiving, from the one or more electric vehicles states of charge for the one or more vehicles;
calculating the updated ordering for the leader vehicle and the one or more electric vehicles according to the states of charge of the one or more vehicles effective to increase the combined range of the leader vehicle and the plurality of other vehicles traveling as the platoon; and
transmitting a second instruction to one or more of the plurality of other vehicles to rearrange according to the updated ordering.

5. The method of claim 1, wherein determining the ordering of the leader vehicle and the plurality of other vehicles further comprises evaluating, for at least a portion of the vehicle and the plurality of other vehicle:

the coefficients of drag for the at least the portion;
energy savings from drafting of the vehicle that has the shortest range of the at least the portion with respect to another vehicle of the at least the portion.

6. The method of claim 1, wherein transmitting the instruction to at least a portion of the plurality of other vehicles to rearrange according to the ordering comprises:
transmitting a first instruction to a first vehicle of the plurality of vehicles to exchange places with a second vehicle of the plurality of vehicles.

7. The method of claim 6, further comprising:
transmitting, by the first vehicle, a second instruction to the second vehicle to exchange places with the first vehicle; and
exchanging places by the first vehicle and the second vehicle.

8. The method of claim 7, wherein the first vehicle is the leader vehicle, the method further comprising:
promoting the second vehicle to be the leader vehicle;
transmitting data regarding the past orderings of the leader vehicle and the plurality of other vehicles over time from the first vehicle to the second vehicle when the second vehicle is promoted to be the leader vehicle.

9. A system comprising a subject vehicle including one or more processing devices and one or more memory devices operably coupled to the one or more processing devices, the one or more memory devices storing executable code effective to cause the one or more processing devices to, when the subject vehicle is operating as a leader vehicle:
receive remaining ranges for a plurality of other vehicles;
determine an ordering of the subject vehicle and the plurality of other vehicles effective to increase a combined range of the subject vehicle and the plurality of other vehicles traveling as a platoon, wherein the determination of the ordering of the subject vehicle and the plurality of other vehicles comprises calculating an updated ordering such that a vehicle of the subject vehicle and the plurality of other vehicles that has a shortest range receives energy savings from drafting regardless of whether the subject vehicle and the plurality of other vehicles realize an overall energy savings from traveling in the platoon in the updated ordering, and wherein the ordering of the leader vehicle and the plurality of other vehicles is determined by:
evaluating past orderings of the leader vehicle and the plurality of other vehicles over time and a speed and time of travel of each of the leader vehicle and the plurality of other vehicles during the past orderings;
determining the ordering partially based on a fairness metric of distribution of energy savings among the leader vehicle and the plurality of other vehicles over time; and
transmit an instruction to at least a portion of the plurality of other vehicles to rearrange according to the ordering.

10. The system of claim 9, wherein the subject vehicle is autonomous.

11. The system of claim 9, wherein the subject vehicle is an electric vehicle.

12. The system of claim 11, wherein the executable code is further effective to cause the one or more processing devices to, when the subject vehicle is the leader vehicle:
periodically receive from the one or more electric vehicles states of charge for the one or more vehicles;
calculate the updated ordering for the leader vehicle and the one or more electric vehicles according to the states of charge of the one or more vehicles effective to increase the combined range of the leader vehicle and the plurality of other vehicles traveling as the platoon; and
instruct one or more of plurality of other vehicles to rearrange according to the updated ordering.

13. The system of claim 9, wherein the executable code is further effective to cause the one or more processing devices to, when the subject vehicle is the leader vehicle, determine the ordering of the leader vehicle and the plurality of other vehicles by evaluating, for at least a portion of the vehicle and the plurality of other vehicle by:
the coefficients of drag for the at least the portion;
energy savings from drafting of the vehicle that has the shortest range of the at least the portion with respect to another vehicle of the at least the portion.

14. The system of claim 9, wherein the executable code is further effective to cause the one or more processing devices to, when the subject vehicle is the leader vehicle, transmit the instruction to at least a portion of the plurality of other vehicles to rearrange according to the ordering by:
transmitting a first instruction to a first vehicle of the plurality of vehicles to exchange places with a second vehicle of the plurality of vehicles.

15. The system of claim 14, wherein the first vehicle is programmed to:
in response to the first instruction, transmit a second instruction to the second vehicle to exchange places with the first vehicle; and
exchange places by the first vehicle and the second vehicle.

16. The system of claim 15, wherein the first vehicle is further programmed to, when the first vehicle is the leader vehicle:
promote the second vehicle to be the leader vehicle; and
transmit data regarding the past orderings of the leader vehicle and the plurality of other vehicles over time from the first vehicle to the second vehicle when the second vehicle is promoted to be the leader vehicle.

* * * * *